Patented Jan. 4, 1949

2,457,797

UNITED STATES PATENT OFFICE 2,457,797

PROCESS FOR THE PREPARATION OF A PIGMENT COMPLEX, INCLUDING A REACTED STARCH

William L. Craig, Westport, Conn., assignor to R. T. Vanderbilt Company, Inc., New York, N. Y., a corporation of New York No Drawing. Application June 16, 1945,
Serial No. 599,957

3 Claims. (Cl. 106—306)

This invention relates to improvements in the manufacture of pigments, including a carbonate pigment and a borate pigment. The carbonate pigment and the borate pigment are of special value in application as fillers and as coating colors in paper manufacture. The borate pigment combines properties which make it of special value and application as a pigment in oil base paints.

The process of my invention is characterized by two steps. In the first, I react calcium chloride with starch. In the second, I react sodium carbonate or sodium tetraborate with the reaction product of the first step. As a result I secure either a carbonate or a borate pigment, which exhibits several unusual properties.

Various prepared starches have hitherto been used as a protective colloid in the control of particle size of carbonate pigments produced by the precipitation. I have discovered that aqueous solutions of calcium chloride of sufficient concentration with respect to calcium chloride will react with raw starch to produce a complex from which improved carbonate pigments and borate pigments can be precipitated. Concentrations approaching saturation with respect to calcium chloride are required to effect the reaction. For example, solutions containing 55% by weight of $CaCl_2$ on the aqueous component will react whereas the reaction virtually ceases if the solution is diluted to a concentration of 35% by weight of $CaCl_2$ on the aqueous component. I am referring to reaction at ordinary temperatures, 20°–25° C., and approximately at neutrality, for example, at a pH of 6.5–7.5. The reaction requires a different period with different starches, depending upon the make-up of the covering of the individual starch particles. With potato starch as an example of an easily processed starch, the reaction will be virtually complete in a matter of minutes, sometimes as little as two or three minutes, whereas with corn starch, as an example of starch difficult to process, the reaction may require as much as several hours, for example, 3–4 hours.

In applying this discovery to the production of precipitated pigments, I have found further that the carbonate and borate pigments precipitated from the reaction product have several unusual properties. Both pigments have unusually low adhesive demands in coating compositions. The carbonate pigment, even after drying, disperses readily in aqueous media over a wide range of concentrations, including concentrations as high as 50%–60% solids, although the reacted starch appears to be substantially insoluble in water. As distinguished from the situation in which prepared starch is used as a protective colloid, the reacted starch in my pigment presumably because of its insolubility is not eliminated in washing of the precipitated pigment. The borate pigment of my invention has extremely fine particle size, is of high finishing value, and has excellent color. The borate pigment of my invention also combines ease of wettability in oil with high oil absorption.

In carrying out the first step of the process of my invention, for example, I dissolve calcium chloride in water and filter if necessary to remove any suspended material. I then stir raw starch into this solution, continuing the stirring and maintaining a temperature of about 20°–25° C. until the reaction is complete. With starches which react rapidly, such as potato starch, it is sometimes advantageous to put the starch in a slurry in water and to add in this form rather than to add it directly to the calcium chloride solution. For example, I may dissolve 111 parts by weight of $CaCl_2$ in 200 parts of water, filter, and stir in 12 parts of raw starch. The product of this reaction is then subjected to the second step of my process.

In carrying out the second step of the process of my invention, I precipitate the calcium content of the complex formed in the first step as a calcium carbonate or as a calcium borate by appropriate addition of sodium carbonate or sodium tetraborate. To precipitate is either "a calcium carbonate" or "a calcium borate" in the sense that it is again a complex including a reacted starch. For example, I dissolve 106 parts by weight of $Na_2CO_3$ in 500 parts of water, heat this solution to about 70° C., and then add it slowly and with stirring to the aqueous reaction product of the first stage and then add the aqueous reaction product of the first stage slowly and with continued stirring. Or, for example, I dissolve 382 parts by weight of $Na_2B_4O_7.10 H_2O$ in 2000 parts of water at a temperature of 40°–70° C., and then add the aqueous reaction product of the first step to this solution slowly and with continued stirring. In either case, as the two solutions mix, the resulting solution gradually thickens as precipitation progresses, may even appear to be approaching a dry condition, and finally breaks with separation of a filterable precipitate from a supernatant aqueous layer. The precipitate is the new pigment product of my invention.

With either the carbonate pigment or the borate pigment, I may separate the pigment by filtration, wash it with water until substantially free from sodium chloride and dry the washed product. Or, in the preparation of fillers or coating compositions in paper manufacture, I may transfer the washed filter cake before drying to an appropriate mill to produce the required dispersion. Handling my new pigments either wet or dry in connection with paper manufacture, I may use them in conventional formulations or, and with special advantage, I may handle them as described in my application Serial No. 422,522, filed December 11, 1941 now matured into Patent No. 2,388,526.

When used in the process of my prior application just identified, I may increase somewhat the proportion of starch reacted with calcium chloride in the first step of my process. However, I have in general found it advantageous to incorporate the high proportions of starch used in accordance with my prior application by adding, following the second step of my process and immediately prior to the enzyme conversion, any additional proportion of starch required.

I claim:

1. A process for preparing pigments comprising reacting raw starch at a temperature approximating 20–25° C. with calcium chloride in an aqueous medium, the concentration of calcium chloride in said aqueous medium being in excess of approximately 35% by weight on the aqueous component, and thereafter reacting with the aqueous reaction product of this first step an aqueous solution of a salt of the class consisting of sodium carbonate and sodium tetraborate.

2. A process for preparing pigments comprising reacting raw starch at a temperature approximating 20–25° C. with calcium chloride in an aqueous medium, the concentration of calcium chloride in said aqueous medium being in excess of approximately 35% by weight on the aqueous component, and thereafter reacting with the aqueous reaction product of this first step an aqueous solution of a salt of the class consisting of sodium carbonate and sodium tetraborate, and separating the precipitated carbonate or borate complex from the aqueous reaction medium.

3. A pigment produced by the process of claim 2.

WILLIAM L. CRAIG.

REFERENCES CITED

The following references are of record in the file of this patent:

UNITED STATES PATENTS

| Number | Name | Date |
|---|---|---|
| 1,273,571 | Bloede | July 23, 1918 |
| 2,140,394 | Ruff | Dec. 13, 1938 |
| 2,188,494 | Bode | Jan. 30, 1940 |